United States Patent
Dong

(10) Patent No.: US 9,856,069 B1
(45) Date of Patent: Jan. 2, 2018

(54) THERMAL INSULATION BAG

(71) Applicant: Xiamen Kingqueen Industrial Co., Ltd., Xiamen (CN)

(72) Inventor: Jinfei Dong, Xiamen (CN)

(73) Assignee: XIAMEN KINGQUEEN INDUSTRIAL CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/292,133

(22) Filed: Oct. 13, 2016

(51) Int. Cl.
  *B65D 81/38* (2006.01)
  *A47J 41/00* (2006.01)

(52) U.S. Cl.
  CPC ...... *B65D 81/3897* (2013.01); *A47J 41/0066* (2013.01)

(58) Field of Classification Search
  CPC .......... B65D 81/3897; A47J 41/0066
  USPC ....... 383/110, 3, 38, 109, 113, 121; 206/522
  See application file for complete search history.

(56) References Cited

U.S. PATENT DOCUMENTS

| | | | |
|---|---|---|---|
| 3,031,121 A * | 4/1962 | Chase | A45C 7/0059 220/902 |
| 3,730,240 A * | 5/1973 | Presnick | B65D 81/052 383/110 |
| 3,889,743 A * | 6/1975 | Presnick | B65D 81/052 165/46 |
| 4,091,852 A * | 5/1978 | Jordan | A45C 7/004 206/522 |
| 4,509,645 A * | 4/1985 | Hotta | A45C 11/20 206/545 |
| 4,598,746 A * | 7/1986 | Rabinowitz | A45C 3/00 206/545 |
| 4,903,859 A * | 2/1990 | Derby | B65D 88/1625 217/36 |
| 5,562,228 A * | 10/1996 | Ericson | A45C 7/0077 206/545 |
| 5,967,390 A * | 10/1999 | Goryl | A01K 97/05 224/153 |
| 2003/0155268 A1 * | 8/2003 | Wang | A45C 3/001 206/522 |

* cited by examiner

*Primary Examiner* — Jes F Pascua
(74) *Attorney, Agent, or Firm* — Leong C. Lei

(57) ABSTRACT

A thermal insulation bag includes a bag body and bag bottom, the bag body includes an outer layer and inner layer, where the outer layer is welded to the bag bottom, the inner layer includes an inner side wall and inner bottom welded to the inner side wall, the inner side wall is formed by welding a one-piece material, and an upper end edge of the inner side wall is welded to the outer layer. The present invention prevents overlapping edges from appearing upon the welding of all sheets because the inner side wall of a one-piece structure is configured on the inner layer of the thermal insulation bag, allowing the thermal insulation bag to have a better appearance.

3 Claims, 9 Drawing Sheets

THERMAL INSULATION BAG

TECHNICAL FIELD OF THE INVENTION

The present invention relates to a thermal insulation device, and more particularly to a thermal insulation bag and the manufacturing of the same.

DESCRIPTION OF THE PRIOR ART

Thermal insulation bag is a kind of outdoor bags, being a bag used to contain all kinds of food and keep the temperature and freshness of food, and used also for cold storage, for example, ice cubes and low temperature articles such as cold drinks being placed inside it, such that thermal insulation is the most basic function thereof.

Conventional thermal insulation bags generally have an outer layer, inner layer and heat insulating layer configured between the inner layer and outer layer, where the inner layer and outer layer are respectively formed by connecting a plurality of sheets together, and the outer layer, heat insulating layer and inner layer together define a thermal insulation room for the placement of articles, with an opening allowing people to access articles being formed on the upper side of the thermal insulation room.

For a thermal insulation bag with excellent thermal insulation properties, the sealability of the thermal insulation room is also a key point of thermal insulation on the basis of the use of the heat insulating layer. Both the inner layer and outer layer of conventional thermal insulation bags are respectively formed by stitching a plurality of sheets together, and the upper end edge of the inner layer and outer layer are stitched together by means of sewing. But, Inner layer cloth and outer layer cloth connected to each other by means of sewing are not good in a sealing effect; outside air is easy to form convection with inside air through pinholes or gaps between the inner and outer layers, resulting in the temperature change inside the thermal insulation bags, the thermal insulation effect being not good. In addition, the inner and outer layer suture aging is easy to lead to the further expansion of the gaps, reducing the use of the thermal insulation bags.

Chinese patent application No. 2015103230024.5 filed by the applicant of the present invention on Jun. 12, 2015 discloses a thermal insulation bag, connecting inner and outer layers of the thermal insulation bag by means of seamless welding, thereby overcoming the above defects of poor thermal insulation effect, short-term use, etc resulted from sewing stitch.

But, the thermal insulation bag mentioned above still has welding irregularities, leading to poor appearance. In addition, it is more complex in manufacturing and higher in production cost.

The conventional method for manufacturing a thermal insulation bag by means of seamless welding is: fusing and bonding all sheets adapted to constitute the outer layer together to form the outer layer of a frame structure; fusing and bonding all sheets adapted to constitute the inner layer together to form the inner layer of a frame structure; then, fusing and connecting the upper end edge of the inner layer with the outer layer; and finally, filling a heat insulating layer between the inner and outer layers and welding the outer layer and a bag bottom.

Because the inner layer and outer layer of the thermal insulation bag are respectively formed by welding a plurality of sheets and the connections of each sheet will respectively form an overlapping edge, resin flow unevenness will happen when the overlapping edges of the inner layers and outer layer are fused, causing the outside of the thermal insulation bag to be not flat, affecting the appearance thereof.

In addition, because the inner layer and outer layer are respectively welded in advance to form a frame body, this limits the operation space when the upper end edge of the inner layer and the outer layer are welded together, and thus, increases the defect rate of products.

SUMMARY OF THE INVENTION

To overcome the defects mentioned above, the object of the present invention is to provide a thermal insulation bag, having a good sealability and welding smoothness.

To achieve the object mentioned above, the present invention proposes a thermal insulation bag, including a bag body and bag bottom, the bag body including an outer layer and inner layer, where the outer layer is welded to the bag bottom, the inner layer including an inner side wall and an inner bottom welded to the inner side wall, the inner side wall is formed by welding a one-piece material, and an upper end edge of the inner side wall is welded to the outer layer.

A plurality of breaches are configured on the inner side wall, the breaches divide the inner side wall into a plurality of sheets in connection with each other, and each two adjacent sheets are welded to each other at the breach.

An inverted V-shaped structure is formed on an upper end of each breach.

The thermal insulation bag further includes a heat insulation layer configured between the outer layer, inner layer and bag bottom.

A plurality of V-shaped grooves are configured on an inner side face of the heat insulating layer between the inner layer and outer layer, and the V-shaped grooves correspond to the respective breaches on the inner side wall.

Thereupon, the thermal insulation bag and the methods for manufacturing the same according to the present invention prevents an overlapping edge from appearing upon the welding of each sheet, ensures the connection smoothness of the inner layer with the outer layer and allows the thermal insulation bag to have a better appearance because the inner layer of the thermal insulation bag has the inner side wall of a one-piece structure. In addition, the breaches each having an inverted V-shaped upper end configured on the inner side wall allow the enclosed chamber formed by the outer layer 11, inner layer and bag bottom to have a definite width so as to ensure the smoothness of the inner layer upon the accommodation of the heat insulating layer.

DETAILED DESCRIPTION OF THE PREFERRED EMBODIMENTS

Figure 1:
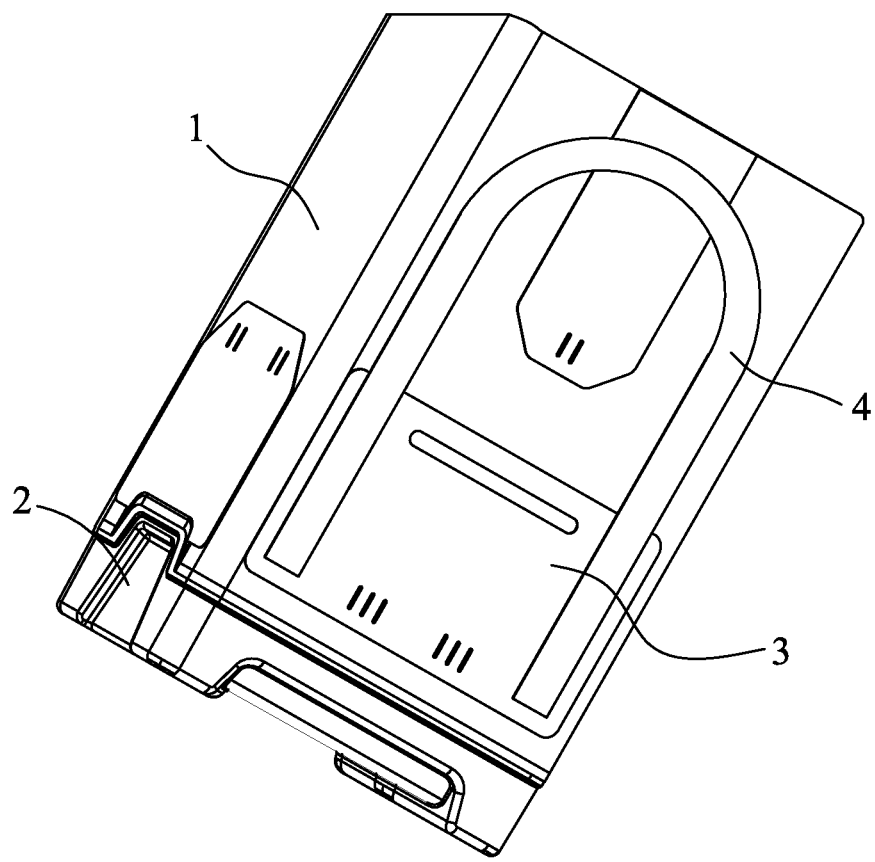
FIG. 1 is a schematically perspective view of a thermal insulation bag of the present invention.
Figure 2:
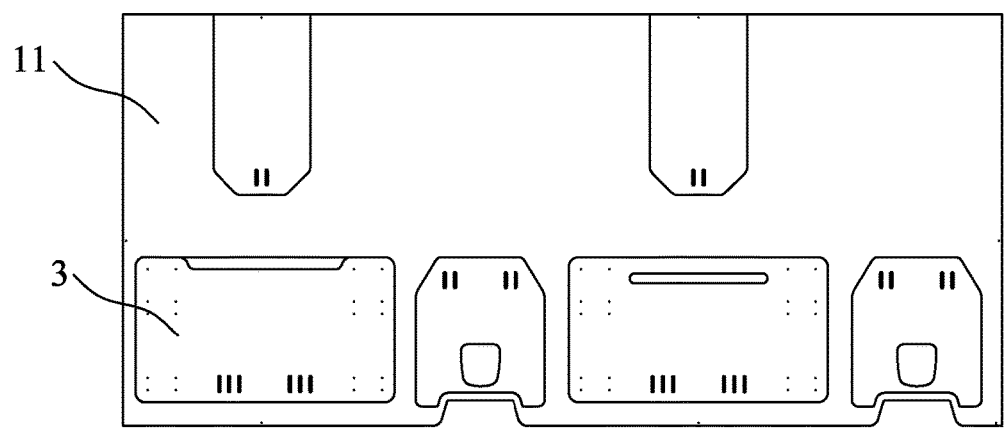
FIG. 2 is a schematic view of an expanded outer structure according to the present invention.
Figure 3:
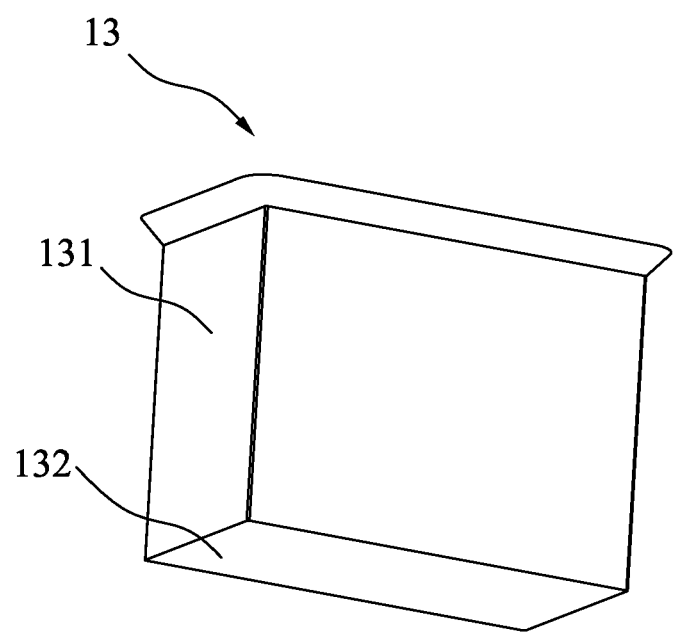
FIG. 3 is a schematically perspective view of an inner layer structure according to the present invention.
Figure 4:
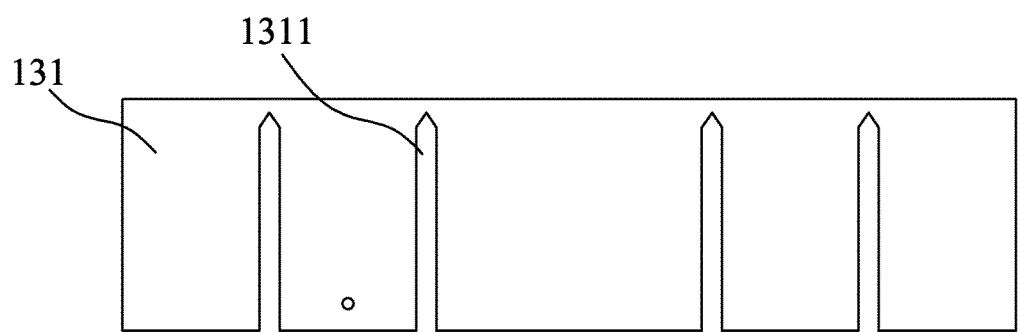
FIG. 4 is a schematic view of an expanded inner side wall structure according to the present invention.
Figure 5:
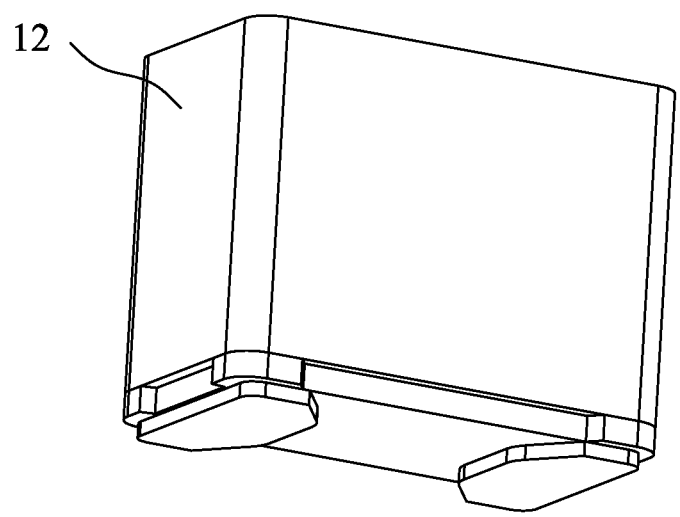
FIG. 5 is a schematically perspective view of a heat insulating layer structure according to the present invention.
Figure 6:
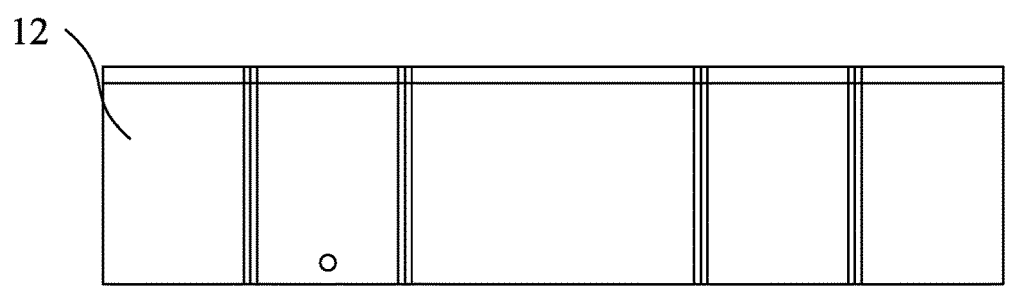
FIG. 6 is a schematic view of an expanded heat insulating layer configured between the inner layer and outer layer according to the present invention.
Figure 7:
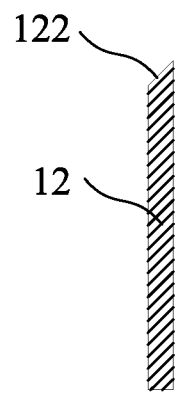
FIG. 7 is a right cross-sectional view of FIG. 6.
Figure 8:
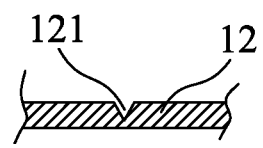
FIG. 8 is a bottom cross-sectional view of FIG. 6.
Figure 9:
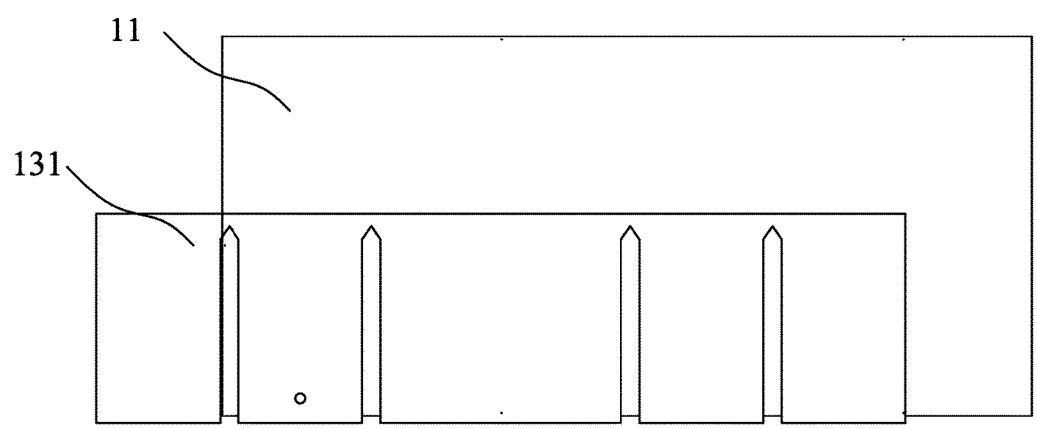
FIG. 9 is a schematic view of the upper end of the inner side wall of the thermal insulation bag welded to the outer layer according to the present invention.
Figure 10:
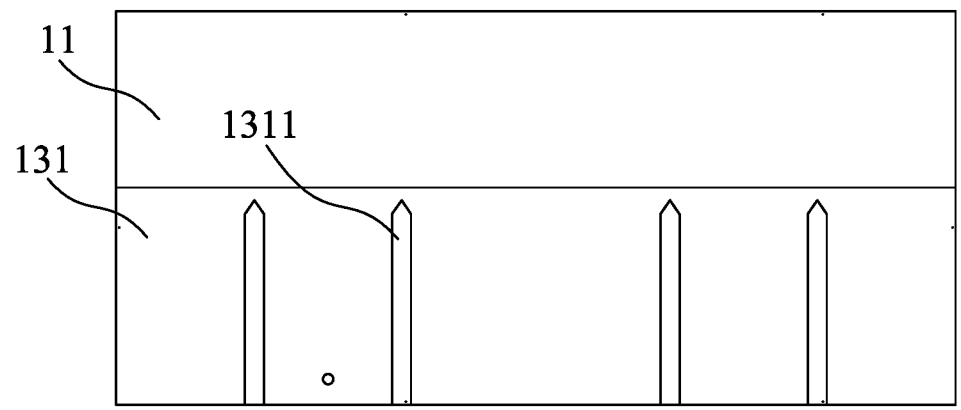
FIG. 10 is another schematic view of the upper end of the inner side wall of the thermal insulation bag welded to the outer layer according to the present invention.
Figure 11:
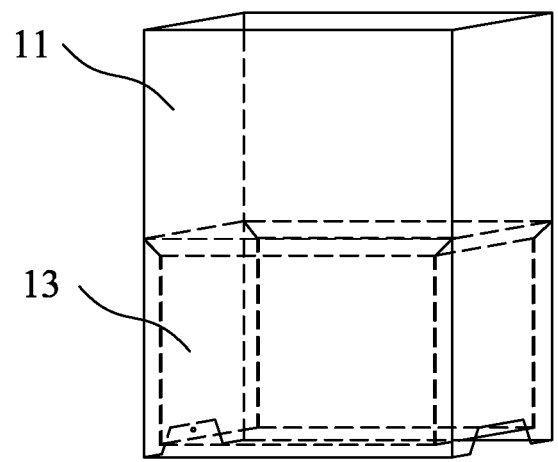
FIG. 11 is a schematically perspective view of the inner side wall and outer layer of the thermal insulation bag after welding according to the present invention.

Referring to FIGS. 1 to 11, the present invention discloses a thermal insulation bag, including a bag body 1 and bag bottom 2, where the bag body includes an outer layer 11 and inner layer 13, the lower end edge of the outer layer 11 is welded to the bag bottom 2, and the upper end edge of the inner layer 13 the outer layer 11. A heat insulating layer 12 may be configured between the inner layer 13, outer layer 11 and bag bottom 2 so as to strengthen the insulation effect of the thermal insulation bag. The bag body 1 of the thermal insulation bag is constituted by the outer layer 11, heat insulating layer 12 and inner layer 12 in sequence from outside to inside and defines a thermal insulation room having a upward opening with the bag bottom 2 at the lower end of the bag body 1, and zippers or Velcro adapted to seal the thermal insulation room are configured on the outer layer 11 at the opening of the thermal insulation room.

The outer layer 11 of the bag body 1 is made of a one-piece material, the right and left side end edges of which are welded to each other to form a cylindrical or polygonal frame body, and the lower end edge of the frame body of the outer layer 11 is then welded to the bag bottom 2, thereby forming an outer structure of the thermal insulation bag; the inner side face of the lower end edge of the outer layer 11 may be welded to the bag bottom 2, or the outer side face of the lower end edge thereof the bag bottom 2 upon the welding of the lower layer 11 to the bag bottom 2. Naturally, the outer layer 11 may also be constituted by a plurality of sheets and formed by welding them into a cylindrical or polygonal frame body, which is then welded to the bag bottom 2.

Furthermore, the inner layer 13 has an inner side wall 131 and inner bottom 132, where the outer side face of the upper end edge of the inner side wall 131 is welded to the inner side of the outer layer 11, and the lower end edge of the inner side wall 131 the rim of the inner bottom 132. The inner side wall 131 of the inner layer 13 is made of a one-piece material on which four breaches 1311 are configured, the breaches 1311 dividing the inner side wall 131 into five sheets connected to each other, the upper ends of which are connected integrally to each other, thus preventing the upper end of each sheet from being formed with an overlapping edge to lead to resin flow unevenness, thereby ensuring the thermal insulation bag a good appearance upon the welding thereof. Each two adjacent sheets of the inner side wall 131 are welded to each other at the breach 1311, and the edges of the sheets at the two ends of the inner wall 131 are then welded together to make the inner side wall 131 form a quadrilateral frame body. Thereafter, the lower end edge of the inner side wall 131 is welded to the inner bottom 132 to make the outer layer 11 of the bag body 1, bag bottom 2 and the inner side wall 131 and inner bottom 132 of the inner layer 13 together form a good sealing thermal insulation room.

The breaches 1311 on the inner side wall 131 of the inner layer 13 may number 5 or more. Correspondingly, the inner side wall 131 is formed into a pentagonal or other polygonal frame body with the outer layer 11. In addition, the inner side wall 131 of the inner wall 13 may be configured with no breach such that the inner side wall 131 is formed into a cylindrical frame body with the outer layer 11 when no breach is configured on the inner side wall 131.

To allow the sealed chamber between the inner layer 13 and outer layer 11 to have a definite width so as to ensure the evenness of the inner layer 13 when the heat insulating layer 12 is accommodated therein, the upper end of each breach 1311 of the inner side wall 131 of the inner layer 13 is formed into an inverted V-shaped notch.

The heat insulating layer 12 includes a heat insulating layer configured on the bottom portion of the bag bottom 2 and a heat insulating layer configured between the outer layer 11 and inner side wall 131 of the inner layer 13. The heat insulating layer 12 configured between the outer layer 11 and inner side wall 1311 may be adopted with a one-piece structure, on which four longitudinal V-shaped grooves 121 are configured, the V-shaped grooves 121 corresponding to respective breaches 1311 of the inner side wall 131. The V-shaped groove 131 is configured on the inner side face of the heat insulating layer 12 of a sheet structure; the inner side face of the heat insulating 12 is attached to the inner side wall 13, and the outer side face of the heat insulating layer 121 of a sheet structure the outer layer 11. The upper end of the heat insulating layer 12 of a sheet structure is configured with an inclined face 122 inclined toward the inner side face thereof, which corresponds to the upper part of the inner side wall 131.

To allow the thermal insulation bag to be carried and used conveniently, hand-strips 4 are configured on the outer side face of the outer layer 11 of the bag body 1. To allow the opening of the thermal insulation room to be sealed better, a upper buckle is configured on the opening of the thermal insulation room, and a corresponding lower buckle matching with the upper buckle the outer side face of the outer layer 11. Furthermore, the outer side face of the outer layer 11 of the bag body 1 may further be configured with a thin layer 3, which is formed into an accommodation space with an opening facing upward for the placement of small articles between the outer side face of the outer layer 11 and it, where the opening of the accommodation space may be closed and opened through a zipper or Velcro.

Compared to the prior art, the thermal insulation bag disclosed by the present invention sets a plurality of sheets constituting the inner side wall 131 of the inner layer 13 to be an integrated structure, preventing overlapping edges upon the welding of the plurality of sheets that result in the resin flow evenness upon the welding of the inner layer 13 to the outer layer 11, thereby ensuring the smoothness of the inner layer in connection with the outer layer 11 and the good appearance of the thermal insulation bag.

When the inner layer 13 and outer layer 11 of the thermal insulation bag is formed into a cylindrical frame body, i.e. the thermal insulation bag is formed into a barrel structure, a method for manufacturing a thermal insulation bag of the structure are shown as the following:

Step 1: welding the upper end edge of the inner side wall 131 of the inner layer 13 to the inner side face of the outer layer 11 through welding equipment. The upper end edge of the inner side wall 131 being first welded to the outer layer 11 can ensure the welding smoothness and consistency of the inner side wall 131 and outer layer 11.

The upper end edge of the inner side wall 131 is welded to the inner side face of the outer layer 11 after the two side end edges of the inner side wall 131 are aligned with the two corresponding side end edges of the outer layer 11 upon the welding of the inner side wall 131 to the outer layer 11, which makes the subsequent welding of the inner side wall 31 to the outer 11 simple. Naturally, the two side end edges of the inner side wall 131 may also be staggered with the two side end edges of the outer layer 11, and the upper end edge of the inner side wall 131 is then welded to the inner side of the outer layer 11, which further ensures the smoothness of the welding of the inner side wall 31 to the outer layer 11.

Step 2: welding the two side end edges of the inner side wall 131 of the inner layer 13, and welding the two side end edges of the outer layer 11 through welding equipment. The inner side wall 131 of the inner layer 13 is formed into a cylindrical frame body together with the outer layer 11.

Step 3: welding the lower end edge of the outer layer 11 to the bag bottom 2 through welding equipment, and welding the lower end edge of the inner side wall 131 of the inner layer 13 to the inner bottom 132 through welding equipment, thereby forming a thermal insulation bag of good sealability mainly constituted by the inner layer 13 and outer layer 11.

When the inner layer 13 and outer layer 11 of the thermal insulation bag is formed into a polygonal frame body, the thermal insulation bag assumes a polygonal frame body structure, a method for manufacturing a thermal insulation bag of the structure being shown as the following:

Step 1: welding the upper end edge of the inner side wall 131 of the inner layer 13 to the inner side face of the outer layer 11 through welding equipment. The upper end edge of the inner side wall 131 being first welded to the outer layer 11 can ensure the welding smoothness and consistency of the inner side wall 131 and outer layer 11.

The upper end edge of the inner side wall 131 is welded to the inner side face of the outer layer 11 after the two side end edges of the inner side wall 131 are aligned with the two corresponding side end edges of the outer layer 11 upon the welding of the inner side wall 131 to the outer layer 11, which makes the subsequent welding of the inner side wall 31 to the outer 11 simple. Naturally, the two side end edges of the inner side wall 131 may also be staggered with the two side end edges of the outer layer 11, and the upper end edge of the inner side wall 131 is then welded to the inner side of the outer layer 11, which further ensures the smoothness of the welding of the inner side wall 31 to the outer layer 11.

Step 2: welding each two adjacent sheets separated by the breach 1311 on the inner side wall 131 of the inner layer 13 through welding equipment, thereby allowing the inner side wall 131 and outer layer 11 to form into a semi-enclosed frame body.

Step 3: welding the two side end edges of the inner side wall 131 of the inner layer 13 to each other through welding equipment, and then welding the two side end edges of the outer layer 11 to each other, thereby forming the inner side wall 131 and outer layer 11 into a polygonal frame body.

Step 4: welding the lower end edge of the outer layer 11 to the bag bottom 2 through welding equipment, and then welding the lower end edge of the inner side wall 131 of the inner layer 13 to the inner bottom 132 through welding equipment.

To strengthen the thermal insulation effect, the thermal insulation bag may further configured with a heat insulating layer 12, it is namely that the heat insulating layer 12 may be configured between the outer layer 11 and inner side wall 131 and on the inner side face of the bag bottom 2 after the lower end edge of the outer layer 11 is welded to the bag bottom 2 in the step 4 mentioned above, and the inner side wall 131 of the inner layer 13 is then welded to the inner bottom 132. Otherwise, the heat insulating layer may be placed between the inner layer 13 and outer layer 11 after the inner side wall 131 is welded to the inner bottom 132, and the outer layer 11 is then welded to the bag bottom 2.

In the methods mentioned above, the inner side wall 131 of a one-piece structure is first welded to the outer layer 11, and the inner side wall 131 and outer layer 11 are then welded together to form a frame structure. Compared to the prior art in which the inner side wall 131 and outer layer 11 are respectively welded into a frame structure, and the upper end edge of the inner side wall 131 and outer layer 11 are then welded together, the methods of the present invention has a larger operation space for the welding of the upper end edge of the inner side wall 131 to the outer layer 11, capable of ensuring the welding consistency and smoothness of the upper end edge of the inner side wall 131 to the outer layer 11, increasing the quality of the thermal insulation bag and reducing the defective rate thereof. In addition, the prior art must have the aid of molds to weld the inner side wall 131 of a frame structure to the outer layer 11 to allow the connection smoothness of the chamfer of the inner side wall 131 with the chamfer of the outer layer 11. Therefore, the methods of the present invention can ensure the better connection smoothness of the inner side wall 131 with the outer layer 11 even without using the molds compared to the prior art.

In the present invention, both the inner layer 13 and outer layer 11 are made from thermoplastic material, which may be made from TPU (thermoplastic polyurethane elastomer rubber), PVC (polyvinyl chloride) or TPU laminated fabric or PVC laminated fabric; the heat insulating layer 12 may be a sponge, cotton insulation, foam, EVA (ethylene-vinyl acetate copolymer) or other capable of playing insulation material effect.

To sum up, the thermal insulation bag and the methods for manufacturing the same according to the present invention prevents an overlapping edge from appearing upon the welding of each sheet, ensures the connection smoothness of the inner layer with the outer layer 11 and allows the thermal insulation bag to have a better appearance because the inner layer 13 of the thermal insulation bag has the inner side wall 131 of a one-piece structure. In addition, the breaches 1311 each having an inverted V-shaped upper end configured on the inner side wall 131 allow the enclosed chamber formed by the outer layer 11, inner layer 13 and bag bottom 2 to have a definite width so as to ensure the smoothness of the inner layer 13 upon the accommodation of the heat insulating layer 12. Furthermore, A larger operation space upon the welding of the upper end edge of the inner side wall 131 to the outer layer 11 according to the methods for manufacturing a thermal insulation bag mentioned above can ensure the welding consistency and smoothness of the upper end edge of the inner side wall 131 to the outer layer 11, increase the quality of the thermal insulation bag and reduce the defective rate thereof upon production; using the methods mentioned above can simplify the production of the thermal insulation bag and reduce molds used in the process of the welding of the thermal insulation bag and decrease the production cost thereof.

I claim:

1. A thermal insulation bag, comprising a bag body and bag bottom, said bag body comprising an outer layer and inner layer, wherein said outer layer is welded to said bag bottom, said inner layer comprising an inner side wall and an inner bottom welded to said inner side wall, said inner side wall is formed by welding a one-piece material, and an upper end edge of said inner side wall is welded to said outer layer; wherein a plurality of breaches are configured on said inner side wall, said breaches divide said inner side wall into a plurality of sheets in connection with each other, and each said two adjacent sheets are welded to each other at said breach, and an inverted V-shaped structure is formed on an upper end of each said breach.

2. The thermal insulation bag according to claim 1, further comprising a heat insulation layer configured between said outer layer, inner layer and bag bottom.

3. The thermal insulation bag according to claim 2, wherein a plurality of V-shaped grooves are configured on an inner side face of said heat insulating layer between said inner layer and outer layer, and said V-shaped grooves correspond to said respective breaches on said inner side wall.

* * * * *